(12) United States Patent
Margolin

(10) Patent No.: US 6,510,785 B1
(45) Date of Patent: Jan. 28, 2003

(54) HAND OPERATED CENTRIFUGAL DRYER

(75) Inventor: Wayne B. Margolin, Kowloon (CN)

(73) Assignee: Mr. Bar-B-Q, Inc., Old Bethpage, NY (US)

( * ) Notice: Subject to any disclaimer, the term of this patent is extended or adjusted under 35 U.S.C. 154(b) by 0 days.

(21) Appl. No.: 10/188,252

(22) Filed: Jul. 3, 2002

(51) Int. Cl.[7] .......................... A47J 37/10; A47J 43/04; F26B 17/24; F26B 17/30; A23L 1/00
(52) U.S. Cl. .............................. 99/495; 34/58; 34/184; 99/511; 494/60; 494/84
(58) Field of Search ........................ 99/495, 509–511, 99/492, 513, 485; 34/58, 8, 184; 210/360.1, 380.1, 781, 784; 494/11, 37, 46, 60, 62, 63, 84; 366/234, 601; 426/443, 478, 601

(56) References Cited

U.S. PATENT DOCUMENTS

| 3,200,737 A |   | 8/1965  | Ferenc |   |
|---|---|---|---|---|
| 3,753,297 A |   | 8/1973  | Mantelet |   |
| 3,885,321 A |   | 5/1975  | Fouineteau |   |
| 4,090,310 A | * | 5/1978  | Koff ............................. | 34/58 |
| 4,189,850 A | * | 2/1980  | Dieterich et al. ............. | 34/59 |
| 4,209,916 A |   | 7/1980  | Doyel |   |
| 5,054,209 A |   | 10/1991 | Koff |   |
| 5,064,535 A | * | 11/1991 | Hsu .......................... | 99/495 X |
| 5,156,084 A | * | 10/1992 | Lin ............................. | 99/495 |
| 5,562,025 A |   | 10/1996 | Bull |   |
| 5,778,769 A |   | 7/1998  | Dodson |   |
| 5,865,109 A |   | 2/1999  | Bull |   |
| 5,904,090 A |   | 5/1999  | Lillelund |   |
| 5,992,309 A | * | 11/1999 | Mulhauser et al. ........... | 99/495 |
| 6,018,883 A | * | 2/2000  | Mulhauser ..................... | 34/58 |
| 6,343,546 B2 | * | 2/2002 | Ancona et al. ............... | 99/495 |

OTHER PUBLICATIONS

Dynamic Price List Feb. 1999 model SD92 and model SD99.

* cited by examiner

Primary Examiner—Timothy F. Simone
(74) Attorney, Agent, or Firm—Natter & Natter

(57) ABSTRACT

A centrifugal dryer for leafy comestibles includes a basket within a cylindrical cabinet. Overlying the cabinet is a cover assembly having a lid, an external crank arm and a gear train sealed within a gearbox mounted to the underside of the lid. An output shaft of the gear train engages a central tower of the basket to rotate the basket about a vertical axis. The cover assembly includes a hand brake mechanism having a brake pad which selectively engages an upper peripheral lip flange of the basket for stopping rotation without straining the gear train.

20 Claims, 5 Drawing Sheets

HAND OPERATED CENTRIFUGAL DRYER

BACKGROUND OF THE INVENTION

1. Field of the Invention

This invention relates generally to food preparation devices and more particularly to a centrifugal dryer for rinsed salad greens, e.g. leafy comestibles, and other foods.

2. Antecedents of the Invention

The careful preparation of tasty salads involved not only cleansing salad greens, e.g. leafy comestibles, such as lettuce, cabbage, spinach, sprouts and the like, by water rinsing but, significantly, removal of residue rinse water, such that the salad were crisp and flavorful.

Several damp dry salad spinners have been proposed, such as those illustrated in U.S. Pat. No. 5,904,090 to LILLELUND, U.S. Pat. No. 5,865,109 to BULL, U.S. Pat. No. 5,562,025 to BULL et al., U.S. Pat. No. 4,209,916 to DOYEL, U.S. Pat. No. 3,885,321 to FOUINETEAU and U.S. Pat. No. 3,753,297 to MANTLET.

Most of these prior devices were designed for household usage and included a basket for carrying the salad greens and an outer bucket, within which the basket was rotated by a lightweight gear drive.

None of these salad spinners were suited for the rigors of commercial usage such as encountered in a catering establishment or restaurant, not only due to their limited volumetric capacity but, additionally, the entire structures thereof were relatively lightweight and could not endure the stresses encountered in commercial usage.

For example, salad spinners in commercial usage developed substantial momentum and when a gear device crank arm was utilized to slow or stop the basket from spinning, the gear drive and bearing surfaces suffered the consequences of undue stress.

U.S. Pat. No. 5,054,209 to KOFF disclosed a commercial centrifuge for drying salad greens which included a spinner basket carried within a hollow body and an electric motor mounted to a cover. A drive shaft extended from the motor or a gear drive and engaged a lid which was secured over the top of the spinner basket.

The commercial unit disclosed in the KOFF Patent was relatively bulky, required electric power and required removal of both the cover to which the motor was mounted and the spinner basket lid for the purpose of accessing the interior of the basket. Additionally, cleaning of the multiple parts was cumbersome.

SUMMARY OF THE INVENTION

A centrifugal damp dryer for rinsed foods includes a cylindrical cabinet having a cover assembly and a fenestrated food basket journalled for rotation within the cabinet about an axis concentric with the cabinet and the cover assembly.

The cover assembly carries a gear train having a crank arm input shaft and an output shaft. The axes of the input and output shafts are concentric with the axes of the cabinet and the fenestrated basket. The output shaft includes a noncircular tip which is engaged in a mating aperture formed in a central tower of the basket.

A hand brake mechanism, mounted to the cover assembly, includes a brake pad which selectively engages the basket to halt rotation without stressing the gear train.

From the foregoing compendium, it will be appreciated that it is an aspect of the present invention to provide a hand operated centrifugal dryer for rinsed foods of the general character described which is not subject to the disadvantages of the antecedents of the invention aforementioned.

It is a feature of the present invention to provide a hand operated centrifugal dryer for rinsed foods of the general character described which is easy to use by relatively unskilled kitchen personnel.

A consideration of the present invention is to provide a hand operated centrifugal dryer for rinsed foods of the general character described which is configured for economical mass production fabrication.

Another aspect of the present invention is to provide a hand operated centrifugal dryer for rinsed foods of the general character described which is particularly well adapted for commercial usage in restaurants and catering establishments.

To provide a hand operated centrifugal dryer for rinsed foods of the general character described which is fabricated with relatively few separable parts is a further feature of the present invention.

Another consideration of the present invention is to provide a hand operated centrifugal dryer for rinsed foods of the general character described which may be easily cleaned.

A further feature of the present invention is to provide a hand operated centrifugal dryer for rinsed foods of the general character described which is readily transportable.

Another aspect of the present invention is to provide a hand operated centrifugal dryer for rinsed foods of the general character described which is well suited for batch operation of relatively short cycle duration.

Yet another feature of the present invention is to provide a hand operated centrifugal dryer for rinsed foods of the general character described wherein a rotating basket is engaged by a brake mechanism.

Other aspects, features and considerations of the present invention in part will be obvious and in part will be pointed out hereinafter.

With these ends in view, the invention finds embodiment in the various arrangements of parts, combinations of elements and series of steps by which the aforesaid aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
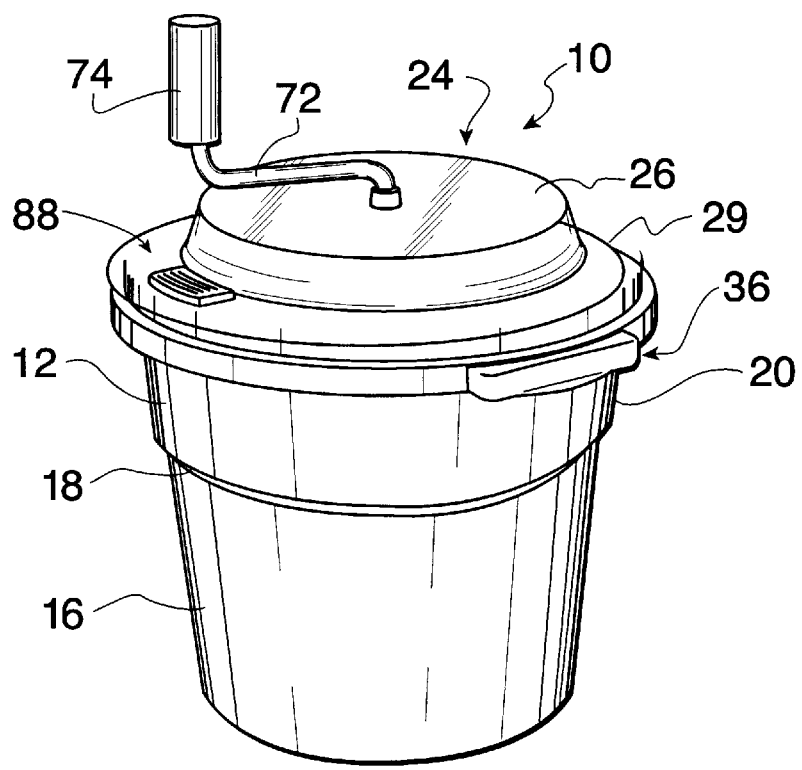
FIG. 1 is a perspective view of a hand operated centrifugal dryer constructed in accordance with and embodying the invention and illustrating a cabinet and a cover assembly including crank arm which drives a gear train for rotating a fenestrated basket carried in the cabinet.
Figure 3:
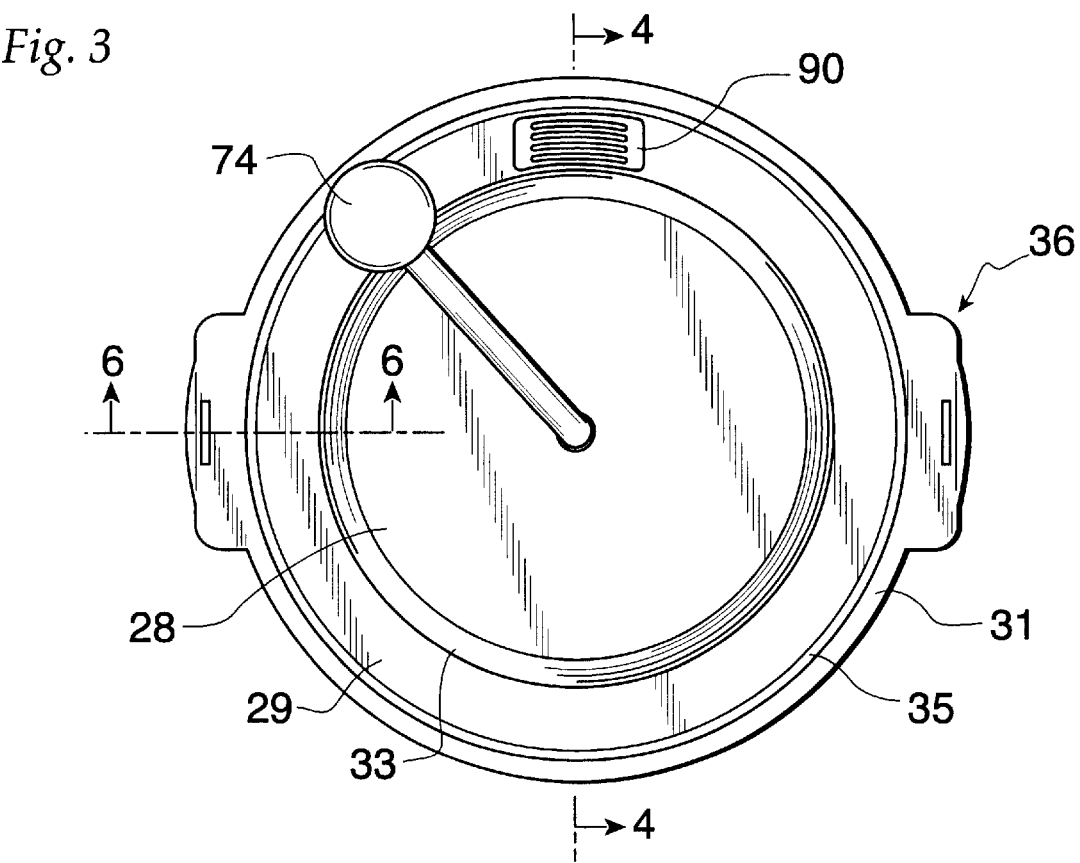
FIG. 3 is a top plan view of the centrifugal dryer showing the crank arm and a brake actuator.
Figure 2:
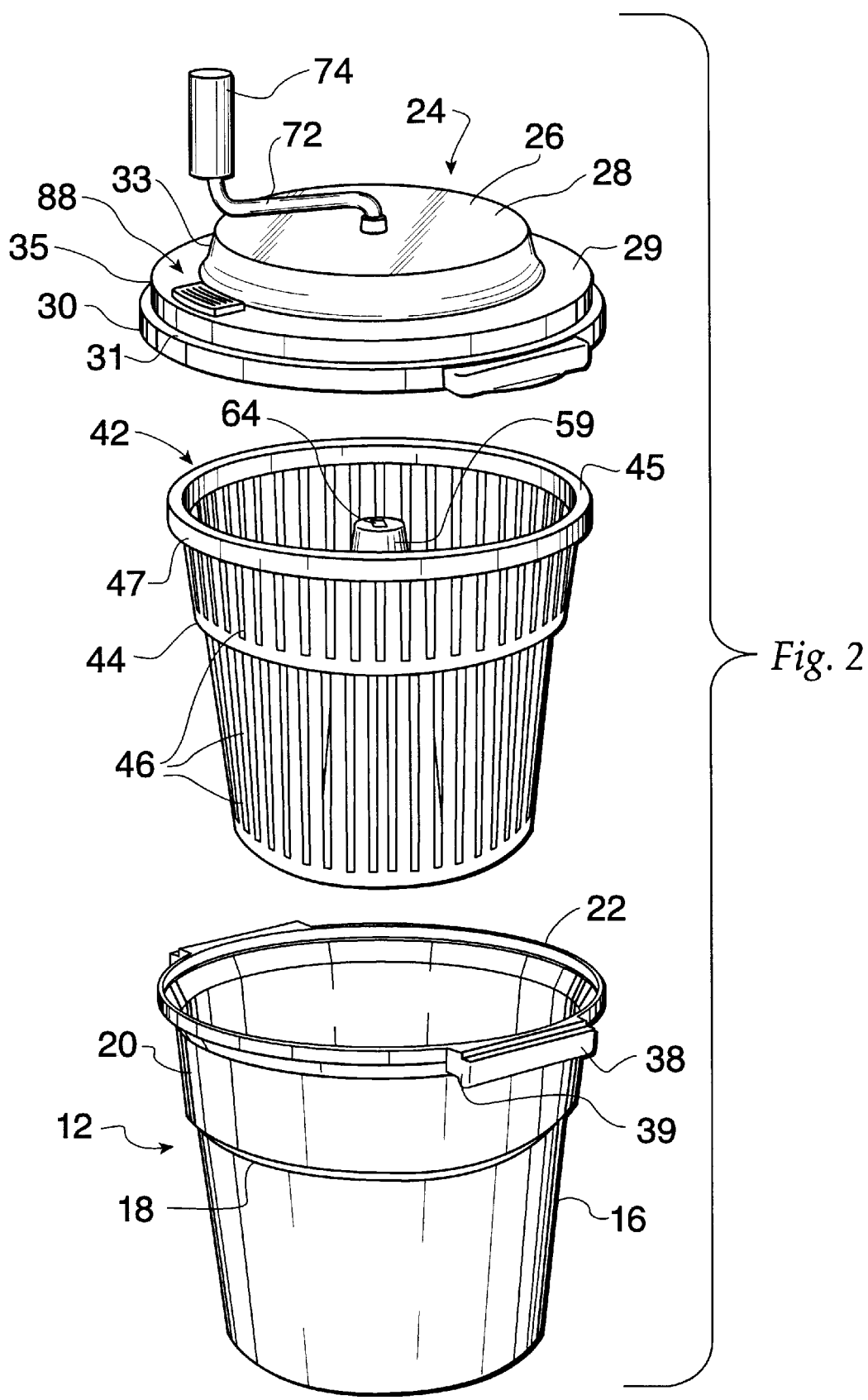
FIG. 2 is an exploded view of the centrifugal dryer illustrating the fenestrated basket.

With reference now to the drawings, wherein like numerals will be employed to denote like components in the various figures, the reference numeral 10 denotes generally a hand operated centrifugal dryer constructed in accordance with and embodying the invention.

The dryer 10 includes a cabinet 12 having a vertical axis 14 and with a commercial volumetric capacity, e.g. 20–25 litres. An outwardly flared, e.g. 3°, side wall 16 extends upwardly to a sloped flare 18 and into an upper side wall 20. The upper side wall 20 includes a draft angle of approximately 1° and a further flare 21, terminating at a substantially circular peripheral top edge 22.

A cover assembly 24 includes a shell 26 having a central horizontal raised platform 28 and concentric stepped horizontal rings 29, 31 joined by risers 33, 35. The shell 26 terminates at a lower peripheral skirt 30. A concentric inner lip 32 on the underside of the shell 26 extends downwardly to define a channel 34 between the lip 32 and the skirt 30 and within which the cabinet peripheral top edge 22 is received.

The ring 31 includes diametrically opposed radial handle extensions 36. The extensions 36 overlie grips 38 which extend from the peripheral top edge 22. The grips 38 include closed end walls 39. An outer lip 37 of the grip 38 is engaged by an inwardly projecting catch 40 of the handle extension 36 to maintain the cover assembly in snap fit engagement over the cabinet 12.

In accordance with the invention, salad greens such as leafy comestibles and other rinsed foods are placed within an open large capacity fenestrated basket 42 which is received within the cabinet 12 and rotates about the axis 14. The basket 42 includes a stepped side wall 44.

At the upper end of the side wall 44 is an annular horizontal flange 45 which terminates at an outer downturned lip 47. The wall 44 includes a plurality of fenestrations 46 to permit water, expelled by centrifugal force from the rinsed foods, to be ejected from the basket and impinge upon the inner surface of the cabinet side walls 16, 20, remote from the food and from the basket.

Fenestrations 46 are also provided in the bottom of the basket 42 to permit gravity draining of water. A sloped floor 48 of the cabinet includes a drain aperture 50 to avoid accumulation of water within the cabinet 12.

Projecting upwardly from the sloped floor 48 is a hollow stanchion 52 having an upwardly projecting fixed axle 54 which is seated in a bore 55.

The fenestrated basket 42 is provided with an axial hollow tower 58, dimensioned to fit over the stanchion 52. Mounted to an upper portion of the tower 58 is a coupling 59 which houses a radial bearing 60 and a thrust bearing, comprising a ball 62. Circumferential surfaces of the fixed axle 54 engage the inner face of the radial bearing 60 and the end of the fixed axle 54 bears against the thrust bearing 62.

The top of the tower 58 includes a central, noncircular aperture 64 which is configured to receive a noncircular tip of an output shaft 66 of a gear train 68 which drives the fenestrated basket.

Figure 4:
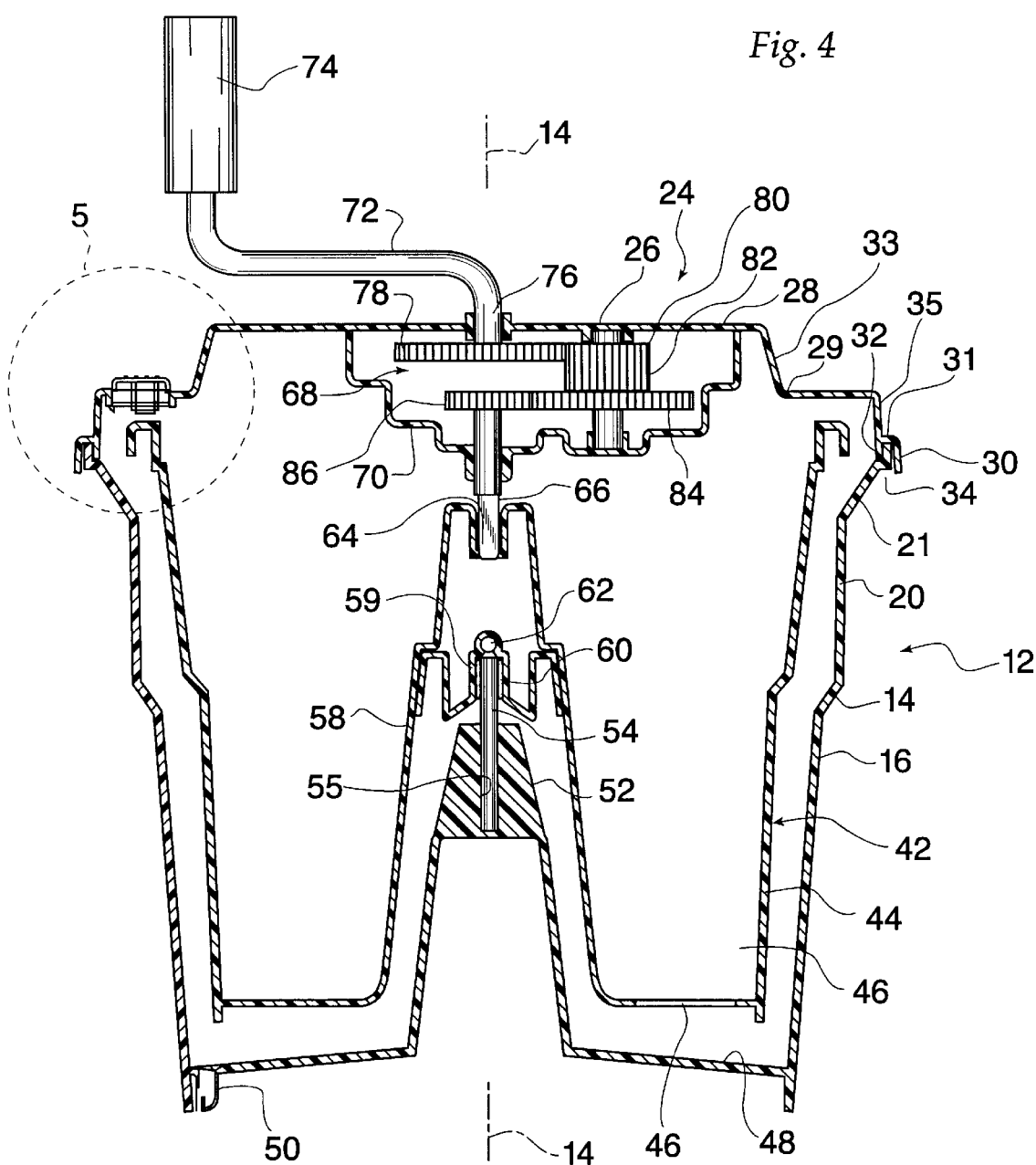
FIG. 4 is a sectional view through the centrifugal dryer, the same being taken along the line 4—4 of FIG. 2 and illustrating the gear train in driving engagement with an axial tower extending from the bottom of the fenestrated basket.

As will be noted from an examination of FIG. 4, the gear train 68 is carried within a gear box 70, which is fixed to the underside of the shell 26.

In accordance with the invention, the gear train 68 is powered by a hand operated crank arm 72, having an engagement handle 74 and an offset shaft 76, which comprises an input shaft of the gear train 68. The shaft 76 is also coaxial with the axis 14.

The shaft 76 is fixed to a drive train input gear 78 which engages an input stage 80 of a cluster gear 82. The cluster gear 82 includes a second stage driving gear 84 which is in engagement with a driven gear 86. Fixed to the driven gear 86 is the gear train output shaft 66 which is received in the noncircular aperture 64 of the coupling 59.

Thus, it will be noted that rotation of the crank arm 72 will cause the fenestrated basket 42 to spin rapidly within the cabinet 12 at a speed dependent upon the rotation speed of the crank arm and the ratio of the gear train.

Pursuant to the invention, a brake mechanism 88 is provided for stopping rotation of the basket to facilitate quick removal of the foods carried in the basket and reloading with a new batch of rinsed foods.

Figure 5:
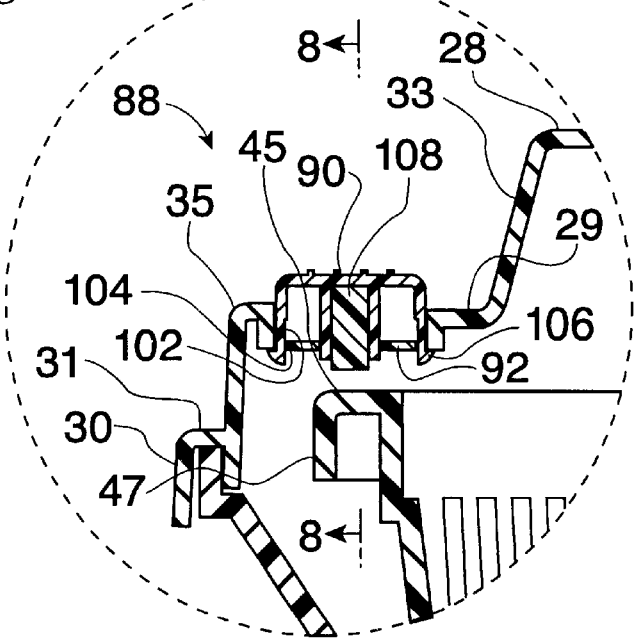
FIG. 5 is an enlarged partial view of a brake assembly and surrounding structure illustrated in FIG. 4.
Figure 6:
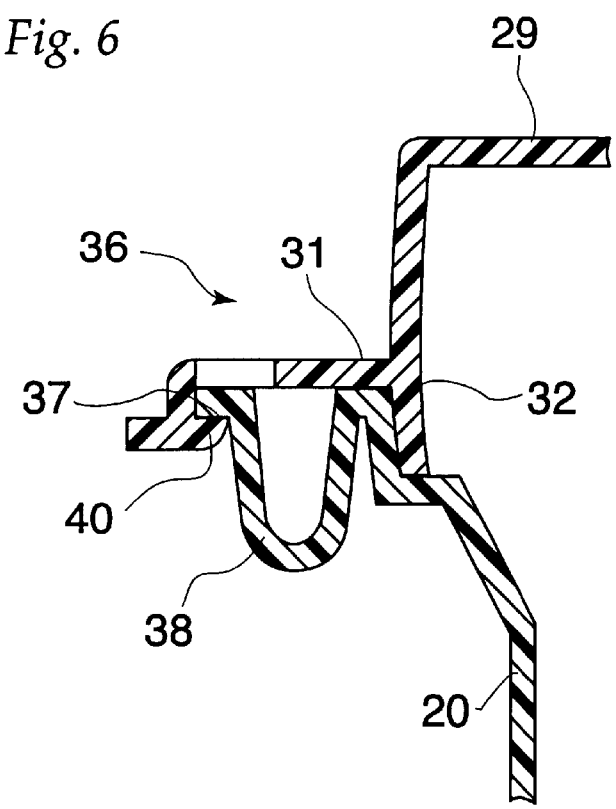
FIG. 6 is an enlarged scale fragmentary sectional view through the cover assembly and the cabinet of the centrifugal dryer, the same being taken substantially along the line 6—6 of FIG. 3 and illustrating a cabinet hand grip in snap fit engagement with a handle extension of the cover assembly.
Figure 7:
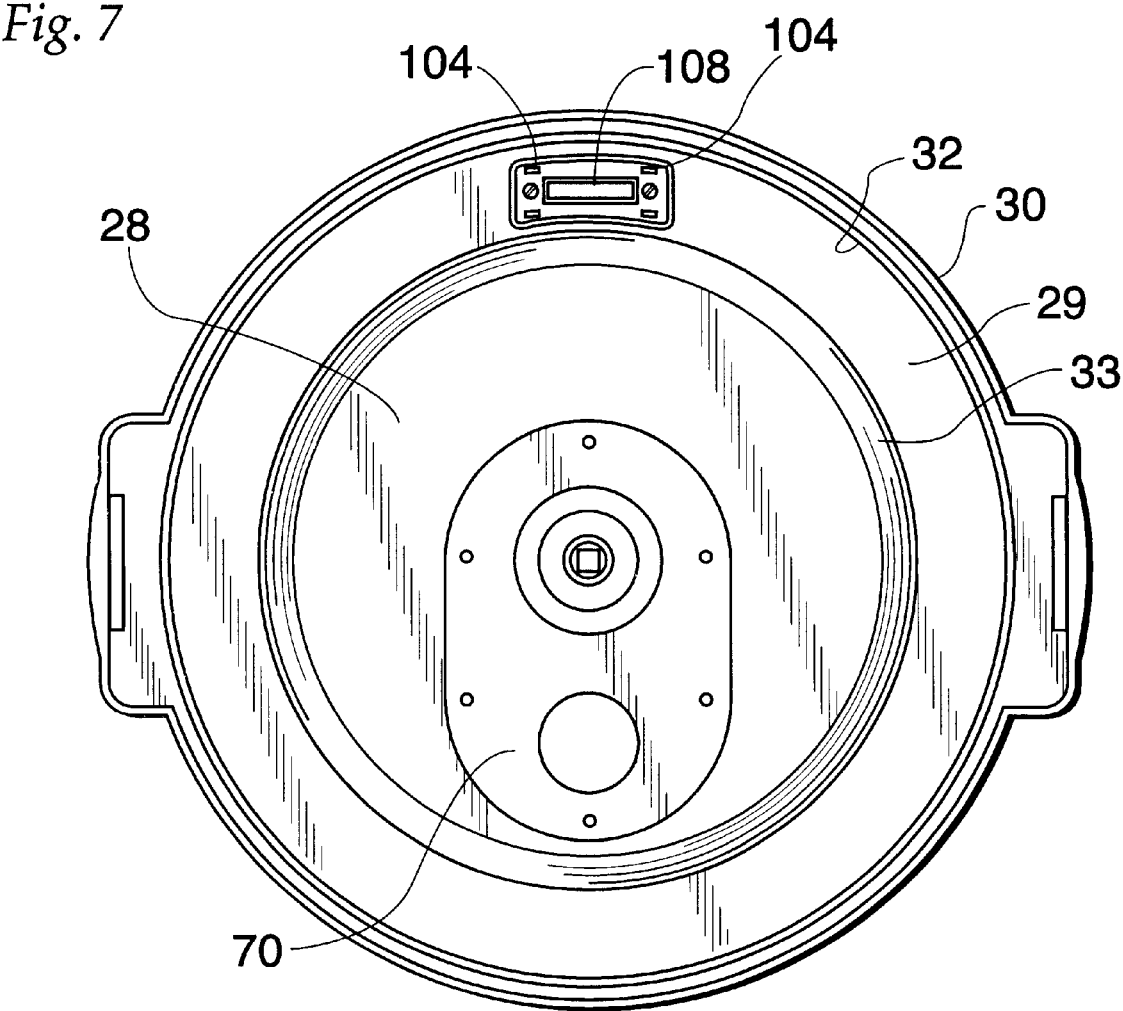
FIG. 7 is an underside view of the cover assembly, illustrating a gear box and a brake pad which is operable to stop rotation of the fenestrated basket.
Figure 8:
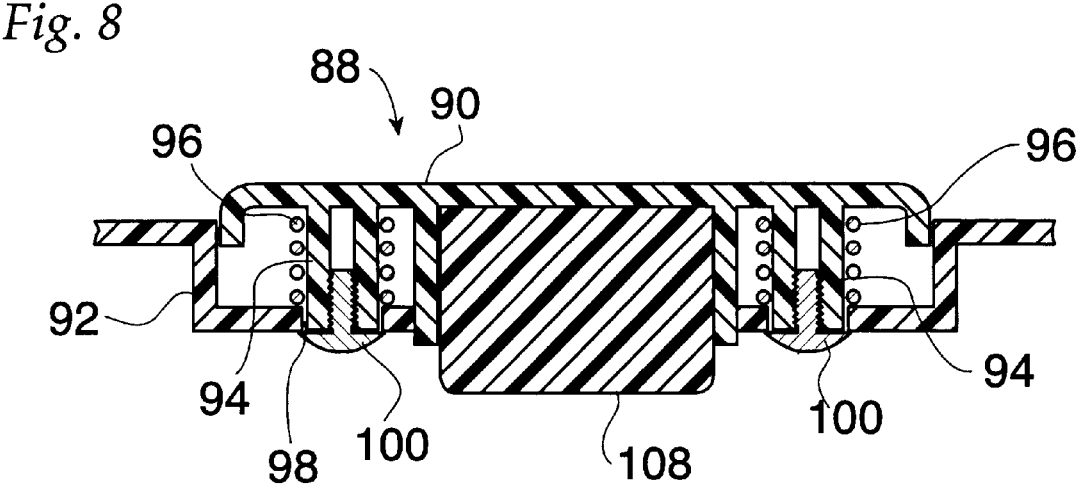
FIG. 8 is a sectional view through the brake assembly, the same being taken substantially along the line 8—8 of FIG. 5.

With reference now to FIG. 5 and FIG. 8 wherein details of the brake mechanism 88 are illustrated, it will be seen that a hand brake actuator 90 is carried within a well 92 which is formed as a depression in the ring 29 of the cover assembly shell 26.

The actuator 90 includes a pair of cylindrical posts 94, each of which carries a helical coil spring 96. The posts 94 are registered with apertures 98 formed in the well 92 such that the actuator 90 may be forced downwardly into the well 92 against the bias of the springs 96.

Each of the posts 94 may include an end screw 100 having an enlarged head which is positioned on the underside of the well 92. The screw head retains the actuator 90 within the well 92. Additionally, each side edge of the actuator 90 may include legs 102 which extends through a registered aperture 104 in the well 92. An enlarged fluke 106 at the end of each leg 102, engages the underside of the well 92 and maintains the brake actuator within the well 92.

The brake actuator 90 additionally includes a socket which carries a brake pad 108. As will be noted from FIG. 5, the brake pad 108 is registered with the annular horizontal flange 45 of the fenestrated basket 42. When the actuator 90 is pressed downwardly by hand, the brake pad 108 engages the horizontal flange 45 to stop rotation of the spinning basket 42.

It should be noted that pursuant to the invention, the dryer 10 comprises only three separable parts, the cabinet 12, the cover assembly 24 and the fenestrated basket 42, which simplifies disassembly for cleaning. In accordance with the invention, a separate lid is not necessary for the fenestrated basket 42, leaving fewer parts to clean and handle. It should be further noted that the gear train 68 is completely enclosed within the gear box 70 and the shell 26 and the components thereof are inaccessible from both safety and hygienic standpoints.

Thus it will be seemed that there is provided a hand operator centrifugal dryer which achieves the various aspects features and considerations of the present invention and which is well adapted to meet the conditions of practical usage.

As other possible embodiments might be made of the present invention and as various changes might be made in the embodiment above set forth without departing from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A hand operated centrifugal dryer for rinsed foods, the dryer comprising a cabinet, a cover assembly and a fenestrated basket mounted in the cabinet for rotation relative to the cabinet and the cover assembly, the cover assembly including a crank arm, the dryer further including a gear train, the gear train comprising a plurality of interengaged gears, the crank arm being operatively connected to the gear train, the gear train having an output for rotating the fenestrated basket, a hand brake assembly, the hand brake assembly being fixed against rotation relative to the fenestrated basket, the hand brake assembly being spring biased to be normally disengaged from the basket, the hand brake assembly being actuatable for engagement against the fenestrated basket to cause the basket to stop rotating.

2. A hand operated centrifugal dryer for rinsed foods as constructed in accordance with claim 1 wherein the hand brake assembly is mounted to the cover assembly.

3. A hand operated centrifugal dryer for rinsed foods as constructed in accordance with claim 2 wherein the brake assembly is seated in a well formed in the cover assembly.

4. A hand operated centrifugal dryer for rinsed foods as constructed in accordance with claim 1 wherein the gear train is carried by the cover assembly, the dryer further including a gear box secured to the cover assembly, the gear box rendering the plurality of interengaged gears inaccessible, whereby both hygiene and safety are promoted.

5. A hand operated centrifugal dryer for rinsed foods as constructed in accordance with claim 1 wherein the cover assembly is secured over the top of the cabinet.

6. A hand operated centrifugal dryer for rinsed foods as constructed in accordance with claim 1 wherein the fenestrated basket includes an annular horizontal flange, the brake assembly being in selective engagement with the flange to cause the fenestrated basket to stop rotating.

7. A hand operated centrifugal dryer for rinsed foods as constructed in accordance with claim 6 wherein the fenestrated basket includes a side wall having an upper end, the side wall having fenestrations therethrough, the horizontal flange extending radially outwardly from the upper end of the side wall.

8. A hand operated centrifugal dryer for rinsed foods, the dryer comprising a cabinet, a cover assembly and a fenestrated basket, the cabinet including a stanchion having a fixed axle, the fixed axle having an axis, the fenestrated basket including a hollow tower seated over the stanchion, the hollow tower having a radial bearing in engagement with a circumference of the axle and a thrust bearing in engagement with an end of the axle, the axle and the hollow tower being coaxial, the centrifugal dryer further including a cover assembly, the cover assembly having a crank arm for rotating the fenestrated basket.

9. A hand operated centrifugal dryer for rinsed foods as constructed in accordance with claim 8 wherein the thrust bearing comprises a ball.

10. A hand operated centrifugal dryer for rinsed foods as constructed in accordance with claim 8 further including a gear train carried by the cover assembly, the crank arm driving the gear train, the gear train having a noncircular output shaft, the hollow tower including a top having a mating noncircular aperture, the gear train output shaft being engaged in the noncircular aperture of the hollow tower, whereby rotation of the crank arm causes the fenestrated basket to rotate.

11. A hand operated centrifugal dryer for rinsed foods as constructed in accordance with claim 10 wherein the gear train includes an input gear which rotates with the crank arm, a cluster gear having a first stage and a second stage, the first stage being driven by the input gear, the gear train further including an output gear, the second stage of the cluster gear driving the output gear, the noncircular output shaft being fixed to the output gear.

12. A hand operated centrifugal dryer for rinsed foods as constructed in accordance with claim 8 wherein the cabinet is substantially cylindrical, the cabinet including diametrically opposed grips, whereby, the dryer may be readily moved from place to place within a commercial food preparation area.

13. A hand operated centrifugal dryer for rinsed foods as constructed in accordance with claim 8, the dryer further including a hand brake assembly, the hand brake assembly being fixed against rotation relative to the basket, the hand brake assembly being spring biased to a normal position which permits the basket to rotate, the hand brake assembly being actuatable to an engaged position for stopping rotation of the basket.

14. A hand operated centrifugal dryer for rinsed foods as constructed in accordance with claim 13 wherein the hand brake assembly is mounted to the cover assembly.

15. A hand operated centrifugal dryer for rinsed foods as constructed in accordance with claim 14 wherein the hand brake assembly is seated in a well formed in the cover assembly.

16. A hand operated centrifugal dryer for rinsed foods, the dryer comprising a substantially cylindrical cabinet, a pair of diametrically opposed grips projecting radially from the cabinet adjacent the top of the cabinet, a cover assembly and a fenestrated basket, the cover assembly including diametrically opposed radial handle extensions, the cover assembly being in engagement with the cabinet when the handle extensions are registered with the grips, the cover assembly further including a crank arm and a gear train, the crank arm being in engagement with the gear train, the gear train having an output shaft, the cabinet further including a stanchion, the fenestrated basket including a hollow tower seated over the stanchion, the gear train output shaft being in driving engagement with the hollow tower for rotating the fenestrated basket within the cabinet.

17. A hand operated centrifugal dryer for rinsed foods as constructed in accordance with claim 16 wherein the stanchion includes a fixed axle.

18. A hand operated centrifugal dryer for rinsed foods as constructed in accordance with claim 17 wherein the hollow tower includes a bearing, the axle being engaged in the bearing.

19. A hand operated centrifugal dryer for rinsed foods as constructed in accordance with claim 18 wherein the bearing comprises a radial bearing, the radial bearing engaging a circumference of the axle.

20. A hand operated centrifugal dryer for rinsed foods as constructed in accordance with claim 19 wherein the bearing further comprises a thrust bearing, the thrust bearing engaging an end of the axle.

* * * * *